July 18, 1967 R. ZULEEG 3,331,998

THIN FILM HETEROJUNCTION DEVICE

Filed April 12, 1965 2 Sheets-Sheet 1

INVENTOR.
RAINER ZULEEG,
BY
W. Kluse Allister, Jr.
ATTORNEY.

July 18, 1967 R. ZULEEG 3,331,998

THIN FILM HETEROJUNCTION DEVICE

Filed April 12, 1965 2 Sheets-Sheet 2

INVENTOR.
RAINER ZULEEG,
BY
W. H. MacAllister Jr.
ATTORNEY.

United States Patent Office 3,331,998
Patented July 18, 1967

3,331,998
THIN FILM HETEROJUNCTION DEVICE

Rainer Zuleeg, Newport Beach, Calif., assignor to Hughes Aircraft Company, Culver City, Calif., a corporation of Delaware Filed Apr. 12, 1965, Ser. No. 447,157
6 Claims. (Cl. 317—234)

This invention relates to an asymmetrical conducting device. More particularly, the invention relates to a thin-film solid state electrical device for current rectification and high frequency mixing.

Diodes of the type to which the present invention appertains are known as thin film diodes. As used herein, the phrase "thin film diode" is intended to include an asymmetrical device composed of one or more thin films of semi-insulator material having a pair of electrodes in contact therewith whose work functions are, respectively, higher and lower than the work function of the semi-insulator material. Such a device is asymmetrically conductive because current can flow easily therethrough in only one direction. Thus, with a positive potential on the high work function electrode (or the anode) and a negative potential on the low work function electrode (or the cathode), electrons enter into the conduction band of the semi-insulator at the cathode and "drift" under the influence of the applied field across the semi-insulator to reach the anode and exist as conduction electrons into the metal. In the reverse bias condition, with the cathode positive and the anode negative, none or only small leakage currents will flow, since the higher work function material sets up a "barrier" for electron transition into the semi-insulator. Under certain high fields, electrons can surmount this barrier and current can be drawn according to the law of Schottky high field emission. Such metal-semi-insulator-metal solid state asymmetrically conductive devices have been described in my application, S.N. 254,209 filed Jan. 28, 1963, entitled "Thin Film Diode" and assigned to the instant assignee. Because the barrier is formed with a semi-insulator film of only one and the same kind of atoms, these prior art thin film diodes are now known as "homojunction" devices. When the junction is formed with semi-insulator or insulator films of different kinds of atoms, the devices are known as "heterojunction" devices and it is to such heterojunction devices that the present invention relates.

Thin film homojunction diodes comprising ohmic and blocking metallic contacts to a vapor-deposited film of cadmium sulfide, for example, are presently subject to some disadvantages, stemming principally from limitations in the quality of the cadmium sulfide film. Because of the deep-trap density, located near the blocking contact in such homojunction devices, and the inability to reduce this density much below $10^{16}$ cm.$^{-3}$, a positive space charge is formed at the blocking contact. The space charge region thus established is quite narrow and results in a fairly high reverse-bias capacitance and in a relatively large reverse-bias leakage current.

It is therefore an object of the present invention to provide an improved solid state asymmetrically conducting device.

Another object of the invention is to provide an improved thin-film diode device.

These and other objects and advantages of the invention are realized according to the present invention by providing a device comprising a thin film of a semi-insulator material disposed between a pair of metal electrodes with one electrode (called the "blocking" electrode) having a work function higher than the work function of the semi-insulator and the other electrode (called the "ohmic" electrode) having a work function lower than the work function of the semi-insulator. The semi-insulator may be of cadmium sulfide, for example. Disposed between the blocking electrode and the semi-insulator body is a thin layer of insulator material. It was found that by making this insulator layer thin enough, it will easily transmit currents of useful magnitude by Schottky emission. Under reverse bias, the separation of the relatively thin space-charge layer from the blocking contact lowers both the capacitance and the contact field. The device of the invention is preferably formed by vacuum deposition of the semi-insulator film, the metal electrodes, and the insulator layer as will be more fully explained hereinafter.

The invention will be described in greater detail by reference to the drawings in which.

Figure 1:
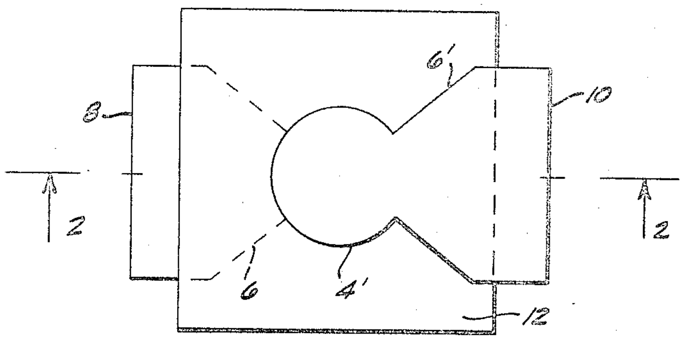
FIGURE 1 is a plan view of a thin film diode according to the invention.
Figure 2:
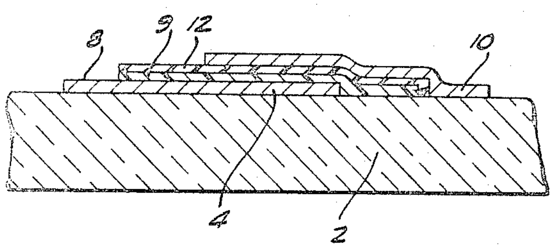
FIGURE 2 is an elevational view in section of the diode shown in FIGURE 1.

Referring now to the drawings, an insulating substrate 2 of glass or the like may be disposed in vacuum deposition apparatus with a mask positioned on the surface of the substrate and having an opening therein corresponding to the desired shape of an electrode to be formed. As shown in FIGURE 1 the electrode shape may be that of a keyhole having a small circular portion 4 integral with a substantially larger leg portion 6 for convenience in making electrical connections to the device. In the deposition process for forming such an electrode, it will be understood that the mask opening will have a shape corresponding thereto. The metal for the electrode 8 is then evaporated and deposited onto the substrate 2 through the opening in the mask. Thereafter the electrode-forming mask is removed and a second mask having a substantially square aperture therein is positioned on the substrate so that the aperture is substantially centered with respect to the circular portion 4 of the thin film electrode 8 previously formed. The mask aperture is large enough so as to expose not only the circular portion 4 of the electrode 8 but also adjacent portions of the substrate, particularly those portions extending away from the leg portion 6 of the electrode. A thin film 9 of a semi-insulator material such as cadmium sulfide is then formed by evaporation and deposition through the mask opening upon the circular portion 4 of the electrode 8 and upon the exposed substrate. With the mask still in place, a thin layer 12 of insulator material such as aluminum oxide ($Al_2O_3$), for example, is deposited upon the semi-insulator film 9. Thereafter the mask is removed and replaced by the mask utilized for forming the first electrode but so positioned as to have the circular portion of the mask centered over the circular portion 4 of the electrode 8 with the leg portion of the mask aperture extending away from the direction of the leg portion 6 of the electrode 8. The metal for forming a second electrode 10 is then evaporated and deposited onto the thin film insulator 9 and exposed portions of the substrate 2. In this manner superimposed thin films or layers of semi-insulator and insulator materials, respectively, may be disposed between the electrodes and the electrodes may be electrically isolated from each other by the semi-insulator and insulator layers where these layers extend over and beyond the electrode 8.

According to the present invention, the metal forming the first electrode 8 may be such as to have a work function lower than that of the semi-insulator film 9 and the metal forming the second electrode 10 should be such as to have a higher work function than that of the semi-insulator film. Under these conditions, the first electrode 8 will constitute the ohmic contact or electrode and the second electrode 10 will constitute the "blocking" contact or electrode. While this arrangement may be reversed, if desired, it will be understood that the insulator layer 12 is always formed so as to be adjacent the blocking electrode. The arrangement shown and described may be achieved by forming the first electrode 8 of aluminum, for example, and by forming the second electrode 10 of gold, for example. The work functions of gold and aluminum, respectively, are 4.8 ev. and 3.8 ev., while the work function of the cadmium sulfide is 4.2 ev. Other satisfactory blocking electrode metals for cadmium sulfide semi-insulator films which may be employed are tellurium, selenium, nickel, copper, and chromium. Other satisfactory ohmic electrode metals or materials for cadmium sulfide semi-insulator films are indium and cadmium.

The semi-insulator layer 9 is twenty or less microns thick, preferably around ten microns, and may be formed by vacuum depositing cadmium sulfide through a mask as described previously. In order to obtain a film of controllable and uniform thickness a preferred method for vacuum depositing the film 9 is by disposing the substrate and source of cadmium sulfide in such a manner as to require evaporated particles from the source to have one or more collisions with some surface other than the substrate prior to deposition upon the substrate. Such a process is fully described in my co-pending application, S.N. 241,854, filed Dec. 3, 1962, and assigned to the instant assignee. The semi-insulator film deposited by this method is found to be of highly oriented crystallites and to have a resistivity of at least $10^4$ ohm-centimeters and a mobility of 10 $cm.^2/v.$ sec. or better and therefore is satisfactory for use as a semi-insulator in the diode device of the invention.

Other semi-insulator materials which may be utilized according to the present invention are compounds formed by elements of the second and sixth columns of the Periodic Table according to Mendeleev as well as compounds formed by elements of the third and fifth columns of this Periodic Table. Some of the more preferable semi-insulator materials in addition to cadmium sulfide are: cadmium telluride, cadmium selenide, zinc sulfide, zinc selenide, zinc telluride, gallium arsenside, gallium phosphide, indium arsenside, indium phosphide, and indium antimonide. These materials are preferred primarily because of their more advantageous physical properties among which are thermal stability and ability to be vapor-deposited.

The insulator film 12 may be formed of such materials as aluminum nitride, cadmium telluride, silicon oxide, aluminum oxide, zinc sulfide, zinc selenide, zinc telluride, and gallium arsenide. The resistivity of the insulator film should be higher than the resistivity of the semi-insulator film 9 by at least two orders of magnitude. Thus, for a cadmium sulfide semi-insulator film as described herein having a resistivity of $10^4$ ohm-cm., the resistivity of the insulator layer should be at least $10^6$. Silicon oxide has a resistivity of $10^{10}$ ohm-cm., while aluminum oxide has a resistivity of from $10^{12}$ to $10^{14}$ ohm-cm. Hence, these materials are eminently satisfactory for use in devices according to the present invention. It will be noted that some of the materials included above as satisfactory as insulators according to the invention are also nominated as satisfactory semi-insulators in the preceding paragraph. These materials are useful as either insulators or semi-insulators because they are capable of being produced so as to have different resistivities depending upon the fabrication techniques employed. Hence, they may be made to have a resistivity useful for semi-insulator purposes or to have a resistivity useful for insulator purposes.

The thickness of the insulator layer 12 should be at least 150 A. and preferably in the range of 200 to 1000 A. depending upon the desired magnitude of the voltage to be rectified, the thicker the layer the greater the voltage. If the thickness is less than 150 A., tunnel emission through the insulator occurs and the device loses its outstanding rectification properties.

While, in addition to the insulator materials identified above, almost any insulator (including organic materials) may be employed in devices according to the invention, the selection of a particular insulator is based upon several considerations among which is a dielectric strength to withstand fields of $10^6$ to $10^7$ volts/cm. for some applications. In addition, it is also desirable that the insulator be of a material which can be vapor-deposited so that devices, including electrodes and semi-insulator film, can be formed entirely by such techniques for convenience in manufacture. Thus, such a device can be fabricated by sequentially vapor-depositing the various parts thereof in a vacuum which only needs be established once for each batch of devices to be formed.

Figure 3:
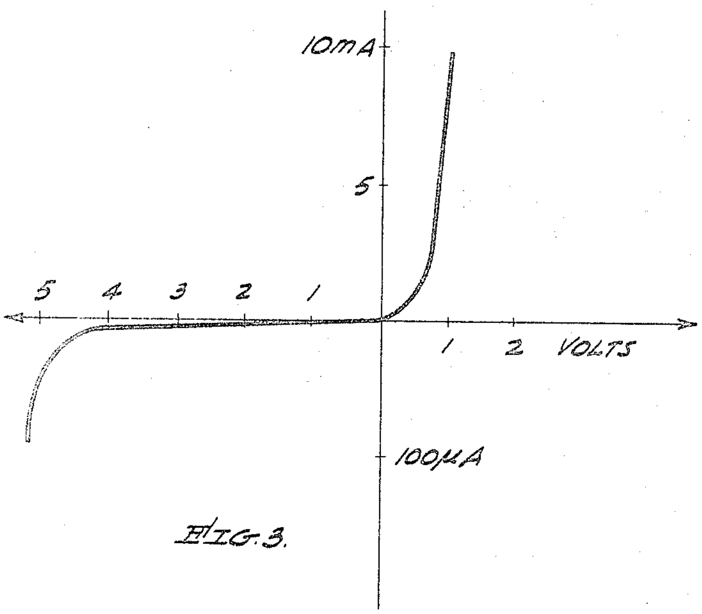
FIGURE 3 is a graph illustrating a typical current-voltage characteristic of a diode device according to the present invention.
Figures 4A, 4B:
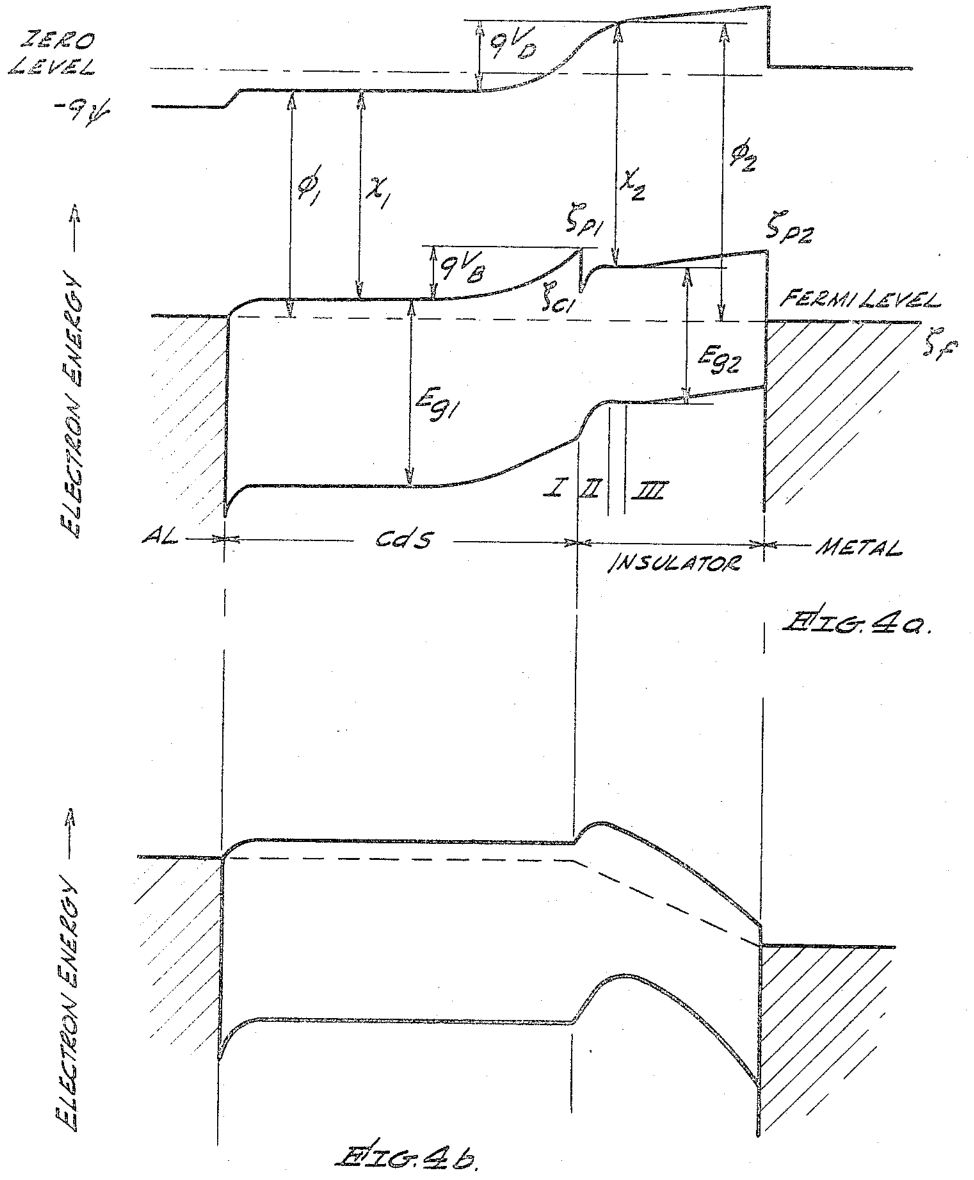
FIGURES 4*a* and 4*b* are graphs illustrating the energy band structure for deposited heterojunction diodes according to the invention.

With reference to FIGURE 3, representative volt-ampere characteristics are shown and demonstrate the excellent rectification ratios obtainable with a diode fabricated according to the present invention. A more detailed discussion of the theory and operation of thin film heterojunction devices according to the present invention is found in an article by R. S. Muller and R. Zuleeg entitled "Vapor-Deposited, Thin-Film Heterojunction Diodes" published in the Journal of Applied Physics, vol. 35, No. 5, pages 1550 to 1556 in May 1964. However, some of the features of a heterojunction diode according to the present invention are summarized herein as follows. With special reference to FIGURES 4(*a*) and 4(*b*), under forward bias the metal electrode 10 affixed to the insulating layer 12 is made positive with respect to the contact 4 on the semi-insulator member 9. In this condition, essentially all of the applied voltage appears across the insulating layer 12 because its resistivity is much higher than that of the semi-insulator. Electrons are emitted from the CdS semi-insulator layer 9 into the insulating film 12. The current which flows through the device is determined by the properties of the heterojunction, and is theoretically given by the classical emission equation:

$$J=A_eT^2 \exp.\left(\frac{-\phi}{kT}\right) \exp.\left[\frac{q}{2kT}(qE/\pi\epsilon\,\epsilon_o)^{1/2}\right] \quad (1)$$

where $A_e$ is the emission coefficient for the junction, $k$ is the Boltzmann constant, T is the absolute temperature, $\phi$ is the energy barrier to electron transfers at the junction, $q$ is the charge on an electron, E is the contact field, $\epsilon$ is the dielectric constant, and $\epsilon_0$ is the permittivity. The emission constant, $A_e$, can be derived through the use of Fermi-Dirac statistics, and has the magnitude 120 amps $cm.^{-2}$ $deg.^{-2}$. This value is independent of the material considered, provided the barrier height $\phi$ in Equation 1 is measured from the Fermi level ($\zeta_f$) in the material forming the emitting contact. That is, for all materials with zero applied field at the contact Equation 1 can be written:

$$J=120T^2 \exp.-(\zeta_p-\zeta_f)/kT \quad (2)$$

where emission takes place over a peak energy level, $\zeta_p$. In metals and degenerate semiconductors, the Fermi level is relatively insensitive to temperature, so that a semi-logarithmic plot of J divided by $T^2$ vs. $1/T$ will theoretically intercept the axis at 120 $amp.^2$ $cm.^{-2}$ $deg.^{-2}$. In semiconductors or semi-insulators, however, $\zeta_f$ is itself a function of temperature so that the form of Equation 2 must be modified in order to show a complete representation of temperature dependence. The deposited CdS which, for the diodes described here, is the emitting material, acts as an n-type semiconductor with a donor density, $N_d$, of roughly $10^{12}$ $cm.^{-3}$. These donors are fully ionized in the temperature range considered. Hence, for this case, the Fermi level $\zeta_f$ is given as a function of temperature by:

$$\zeta_f = \zeta_c - kT \ln\left(\frac{N_c}{N_d}\right) \quad (3)$$

where $\zeta_c$ is the energy of the conduction-band edge and $N_c$ is the density of conduction-band states. Since theoretically, $N_c$, also varies with temperature as:

$$N_c = N_c' T^{3/2}$$

where $N_c' = 2(2\pi m_e k/h^2)^{3/2}$, then by incorporating this dependence into Equation 3, the emission for $n$-doped semiconductors is derived as follows:

$$J = 120T^{1/2}\left(\frac{N_d}{N_c'}\right) \exp. [-(\zeta_D - \zeta_c)/kT \quad (4)$$

where J is given in amps/cm.$^2$, T is expressed in ° K., $N_d$ is expressed in cm.$^{-3}$, and $N_c'$ is expressed in cm.$^{-3}$ ° K.$^{-3/2}$. For Cds:

$$m_e \simeq .14 m_r$$

so that $$N_c' = 2.8 \times 10^{14} \text{ cm.}^{-3} \text{ °} K^{3/2}$$

Thus, the numerical coefficient in Equation 4 becomes $4.3 \times 10^{13}$ $N_d T^{1/2}$ for this material. In Equation 4 all variation with temperature is explicitly apparent.

Under reverse bias, the ohmic contact 4 to the CdS semi-insulator layer 9 is made positive with respect to the metal-insulator junction. Again, in this condition, the bulk of the applied voltage is dropped across the insulating layer 12. In the usual case, whatever space charge exists inside the insulator (regions marked II and III in FIGURE 4) will not be affected by the applied voltage except under high-field or high-current conditions. The space-charge region in the semi-insulating CdS will widen under the influence of the applied voltage, however, and will thereby act to reduce the field in the insulating film 9. The ultimate currents that flow are described by Equation 1, with the emission step $\phi$ now given by $(\zeta_D - \zeta_f)$ in FIGURE 4 and the field E being calculated under consideration of the space-charge-layer widening effect.

From this discussion, the currents flowing in diodes according to the invention will either be limited by contact emission or by transport across the thin film layers, exactly in analogy with a vacuum diode. For contact-limited currents, the voltage-current relationship is described by Schottky emission, and is proportional to exp. ($\propto V^{1/2}$) through the second exponential in Equation 1. For transport-limited currents across the thin film layers, the second exponential becomes unity and current dependence on voltage is determined from the properties of the films themselves.

What is claimed is:

1. A thin film diode device comprising an ohmic electrode member and a blocking electrode member, a layer of semi-insulating material having a thickness of less than twenty microns and a resistivity of at least $10^{+4}$ ohm-centimeters disposed between said electrode members and in contact with said ohmic electrode member, and a layer of insulator material disposed between and in contact with said layer of semi-insulating material and said blocking electrode member, said insulator layer being between 150 A. and 1000 A. thick and having a resistivity higher than the resistivity of said semi-insulator layer.

2. A thin film diode device comprising a deposited metallic ohmic electrode member and a deposited metallic blocking electrode member, a layer of semi-insulating material having a thickness of less than twenty microns and a resistivity of at least $10^{+4}$ ohm-centimeters disposed between said electrode members and in contact with said ohmic electrode member, and a layer of insulator material disposed between and in contact with said layer of semi-insulating material and said blocking electrode member, said insulator layer being between 150 A. and 1000 A. thick and having a resistivity higher than the resistivity of said semi-insulator layer.

3. The invention according to claim 2 wherein said semi-insulating material is cadmium sulfide.

4. The invention according to claim 2 wherein said insulator material is selected from the group consisting essentially of aluminum nitride, silicon oxide, and aluminum oxide.

5. A thin film diode device comprising a deposited electrode of gold, a deposited electrode of aluminum, and a layer of cadmium sulfide having a thickness of less than twenty microns and a resistivity of at least $10^{+4}$ ohm-centimeters disposed between said electrodes and in contact with said aluminum electrode, and a layer of insulator material selected from the group consisting essentially of cadmium telluride telluride, silicon oxide, and aluminum oxide disposed between and in contact with said layer of cadmium sulfide and said gold electrode, said insulator layer being between 150 A. and 1000 A. thick and having a resistivity higher than the resistivity of said layer of cadmium sulfide.

6. A thin film diode device comprising a deposited metallic ohmic electrode member and a deposited metallic blocking electrode member, a deposited layer of semi-insulating material having a thickness of less than twenty microns and a resistivity of at least $10^4$ ohm-centimeters disposed between said electrode members and in contact with said ohmic electrode member, and a deposited layer of insulator material disposed between and in contact with said layer of semi-insulating material and said blocking electrode member, said insulator layer being between 150 A. and 1000 A. thick and having a resistivity higher than the resistivity of said semi-insulator layer.

References Cited

UNITED STATES PATENTS

| | | | |
|---|---|---|---|
| 2,822,606 | 2/1958 | Yoshida | 29—25.3 |
| 3,056,073 | 9/1962 | Mead | 317—234 |
| 3,191,061 | 6/1965 | Weimer | 307—88.5 |
| 3,193,685 | 7/1965 | Burstein | 250—211 |
| 3,204,159 | 8/1965 | Bramley et al. | 317—235 |

OTHER REFERENCES

P. Weimer: Proceedings of the IRE, June 1962, (pp. 1462–1469 relied on).

JOHN W. HUCKERT, *Primary Examiner.*

M. EDLOW, *Assistant Examiner.*